Nov. 23, 1965 S. AUSNIT ETAL 3,219,084
DOUBLE JOINED FASTENER AND METHOD OF FORMING PLURAL BAGS
Filed Oct. 2, 1961 3 Sheets-Sheet 1
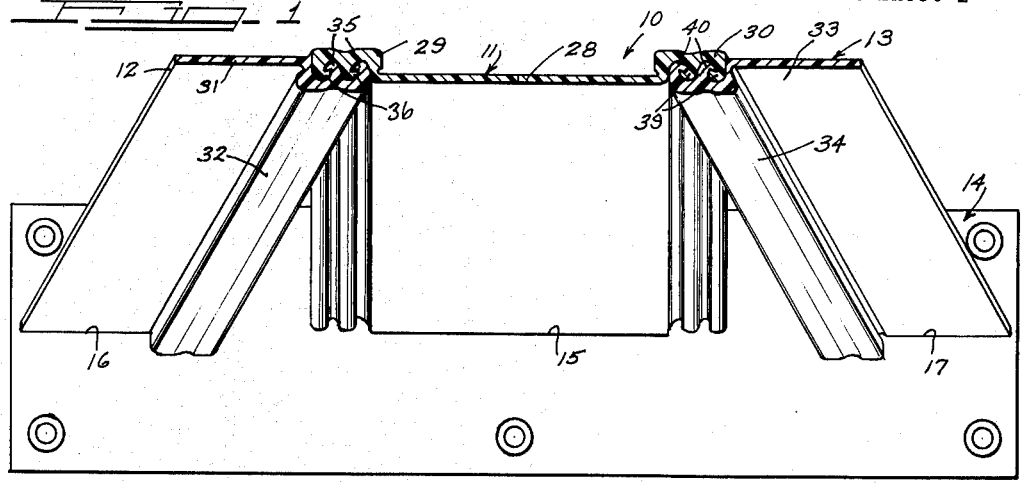
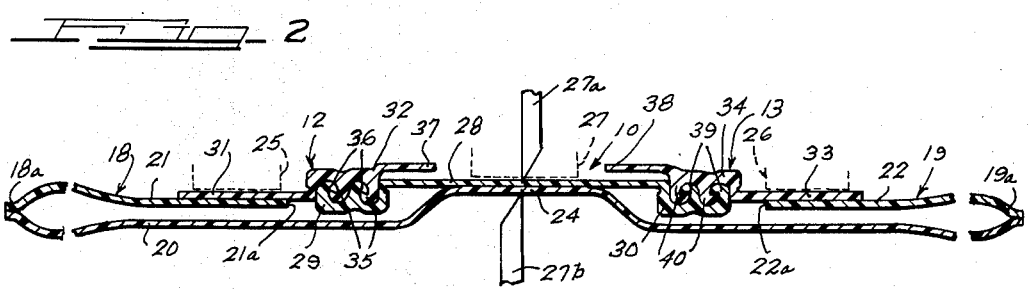
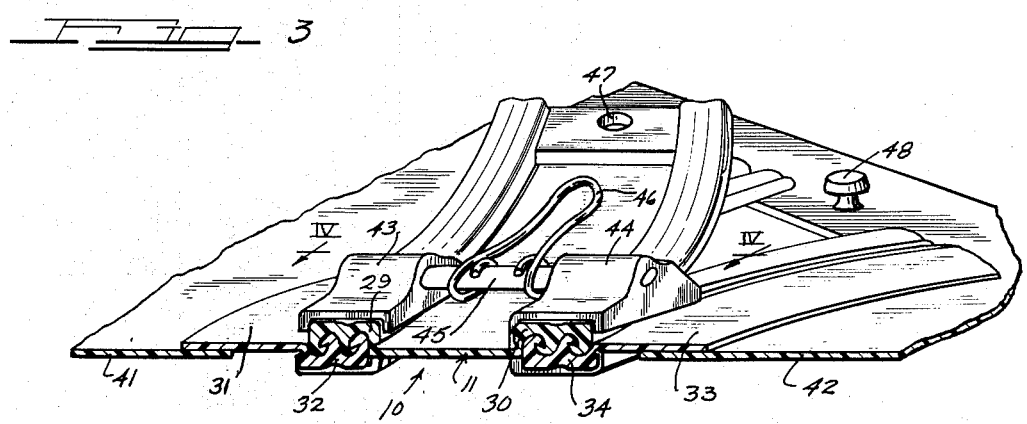
INVENTORS
Steven Ausnit
Karel J. Staller
BY
ATTORNEYS

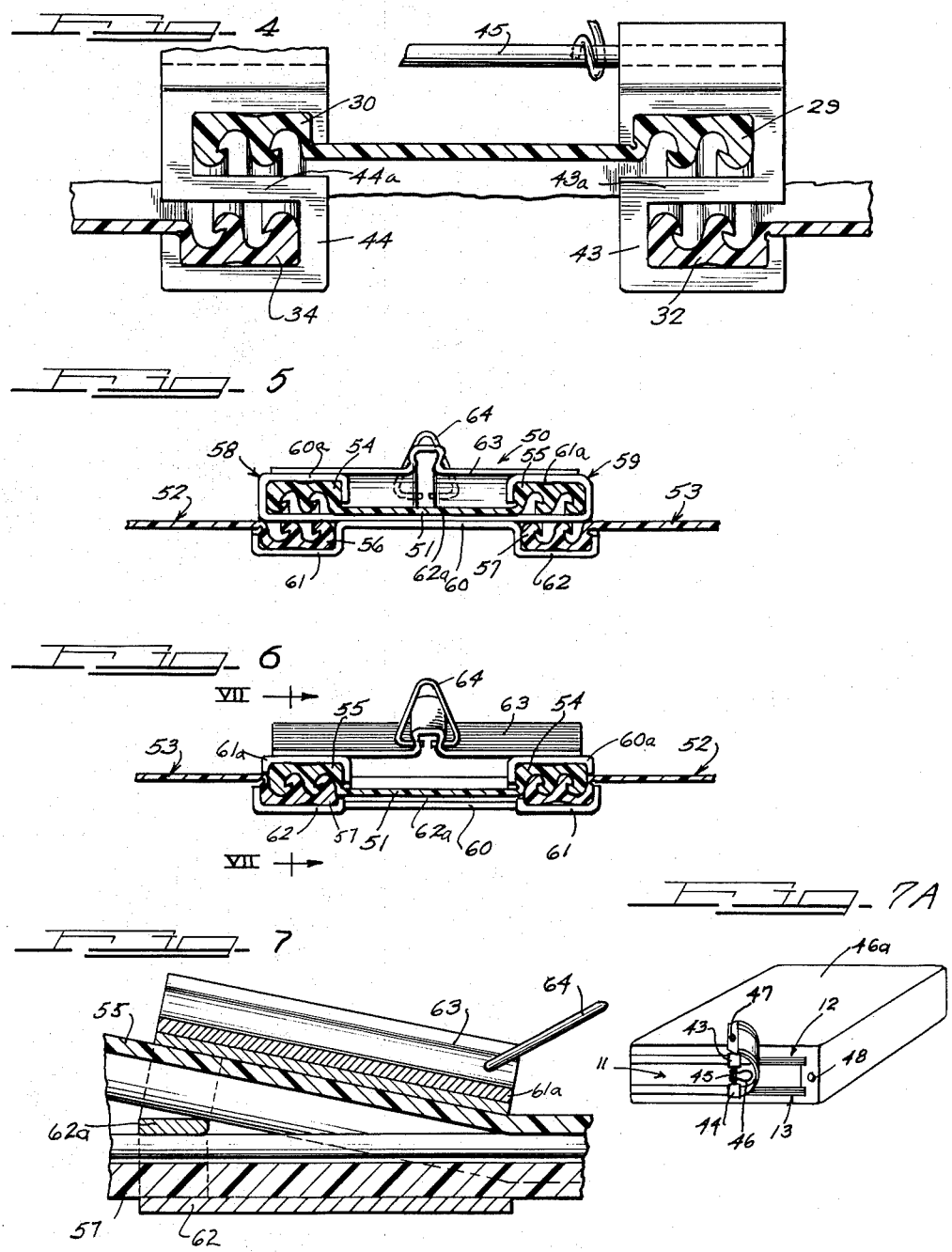

Nov. 23, 1965 S. AUSNIT ETAL 3,219,084
DOUBLE JOINED FASTENER AND METHOD OF FORMING PLURAL BAGS
Filed Oct. 2, 1961 3 Sheets-Sheet 3
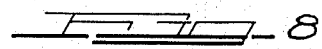
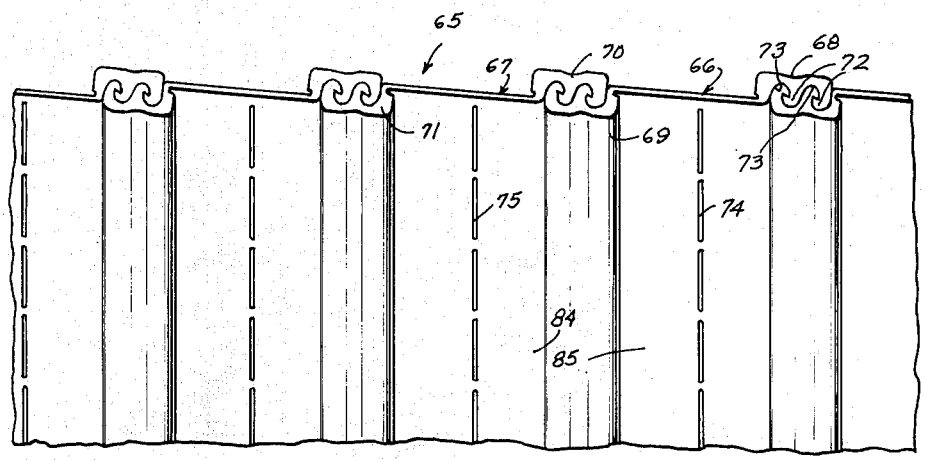
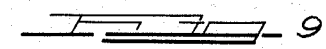
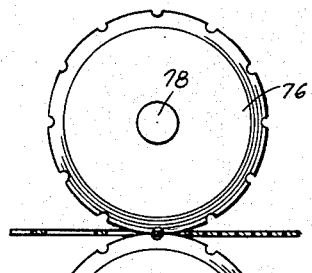
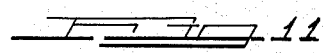
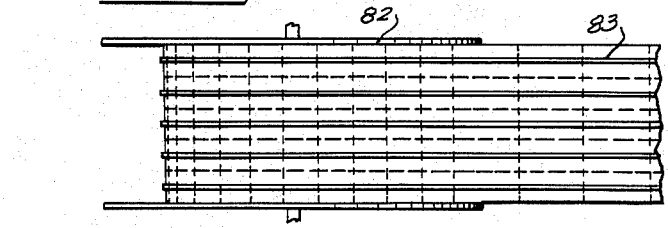
INVENTORS
Steven Ausnit
Karel J. Staller
BY
ATTORNEYS United States Patent Office 3,219,084
Patented Nov. 23, 1965

3,219,084
DOUBLE JOINED FASTENER AND METHOD OF FORMING PLURAL BAGS
Steven Ausnit, New York, N.Y., and Karel J. Staller, Rutherford, N.J.; said Staller assignor to Flexigrip, Inc., New York, N.Y., a corporation of New York
Filed Oct. 2, 1961, Ser. No. 142,381
5 Claims. (Cl. 150—3)

The present invention relates to improvements in flexible closures such as used to close an opening in a pouch or envelope.

More particularly the invention relates to an improved structural combination embodying closure strips using releasably interlocking rib and groove elements formed of a resilient plastic material so that they can be interlocked by a pressure forcing the elements together into interlocking relationship, and so that they can be opened by pulling the elements apart. Closure strips employing interlocking rib and groove elements are well suited for many applications in that they can be inexpensively made of plastic by a continuous extrusion process, and are relatively inexpensive and are durable.

An object of the invention is to provide an improved flexible closure strip structure for obtaining a reclosable opening in a wall such as in a flexible container or pouch.

A further object of the invention is to provide an improved method and structure for the manufacture of bags or pouches with flexible closure strips that permit opening and reclosing the pouches.

A still further object of the invention is to provide an improved closure strip structure which can be manufactured by an extrusion process to provide a strip usable for a number of purposes such as for the expedient manufacture of reclosable bags and pouches or for providing a closure strip for the side of containers or pouches which provides an opening of a substantial width.

A further object of the invention is to provide a closure strip structure and method of manufacture which provides a saving in time and cost of manufacture of the structure over methods heretofore used.

Another object of the invention is to provide an improved simplified slider for closing and opening a closure strip in a wall adapted to provide a wide opening slot.

A feature of the invention is the provision of flexible closure strips arranged with a center strip and edge strips at each side of the center strip, and the strips being attached by releasably interlocking rib and groove elements at the edges of the strips with the strip assembly arranged in combination with plural bags to form an improved method of bag manufacture, or with a container or pouch for providing a wide opening slot in the pouch.

A further feature of the invention is the provision of a continuous sheet having a plurality of longitudinally extending web portions with marginal portions at the edges with upper and lower sections releasably interlocked by the provision of rib and groove elements, with the sheet providing for faster production and easier storage of fastener strips.

Other objects, advantages and features will become more apparent with the teaching of the principles of the invention in connection with the disclosure of the preferred embodiments of the invention in the specification, claims and drawings, in which:

FIGURE 1 is a schematic axonometric view of flexible fastener or closure strips and a die therefor, in accordance with the present invention;

FIGURE 2 is a vertical sectional view illustrating structure and steps in a method of making multiple bags in accordance with the invention;

FIGURE 3 is a perspective view in section illustrating closure strips with sliders;

FIGURE 4 is a vertical sectional view taken substantially along line IV—IV of FIGURE 3;

FIGURE 5 is a vertical sectional view taken through closure strips and illustrating slides of a modified construction;

FIGURE 6 is a sectional view taken through closure strips and illustrating the slides of FIGURE 5 from the closing end, with FIGURE 5 showing the slides from the opening end;

FIGURE 7 is a sectional view taken substantially along line VII—VII of FIGURE 6;

FIGURE 7a is a perspective view of a container combined with a closure arrangement;

FIGURE 8 is a perspective view of a closure strip sheet constructed in accordance with the invention;

FIGURE 9 is a vertical sectional view taken substantially along line IX—IX of FIGURE 10;

FIGURE 10 is a front elevational view illustrating a sheet of fastener strip material passing through a perforating machine; and FIGURE 11 is a top plan view illustrating a sheet of closure strip material being carried in a roll for storage.

As shown on the drawings:

FIGURE 1 illustrates a closure or fastener strip assembly 10 being formed by being extruded from a die plate 14. For purposes of illustration, the ends of the components of the strip assembly 10 are drawn as being brought together and interlocked and it will of course be understood that the individual components are not interlocked until they are sufficiently hardened.

The strip assembly 10 includes a center strip 11 and edge or side strips 12 and 13. The individual strips are extruded respectively through openings 15, 16 and 17 in the die plate 14, with the plastic being forced through the openings.

The strips are formed from a suitable plastic material which is resilient and flexible, and suitable materials include the thermoplastic and thermosetting organic synthetic resins. Of particular importance for this use are the vinyl type resins such as polyvinyl chloride, polyvinyl acetate, polyvinyl chloride-polyvinyl acetate copolymers, and similar vinyl resins, and polyethylene. Rubber, either natural or synthetic is not a preferred material since, in the case of rubber, it is more difficult to control the degree of rigidity for interlocking engagement between the strips. However, by proper compounding and vulcanizing the rubber, the degree of rigidity can be controlled to make rubber acceptable for the purposes of the instant invention.

The strip assembly is shown in FIGURE 2 in combination with pouch or bag elements to provide an improved structure and method for doubling the output of reclosable bags without increasing the number of operations. The method provides for doubling the output of reclosable bag production by dividing one central strip into two strips having one bag sealed on both the right and left sides.

Individual pouches or bags are shown at 18 and 19 which are first formed by a continuous one piece lower or rear wall 20 and upper or front walls 21 and 22. The rear and front walls are joined at their edges by seams as shown at 18a and 19a to form a bag or pouch. It is also possible to make the bags out of one integral piece by folding the rear wall 20 at 18a and 19a so as to form front walls 21 and 22. The upper edges 21a and 22a of the front walls are spaced to provide a gap therebetween and the closure strip assembly 10 is placed over the gap and attached to the upper edges 21a and 22a of the front walls.

The closure strip assembly, in greater detail, includes the center closure strip 11 which has a central web portion 28, FIGURE 1, and thicker marginal portions 29 and 30 at the sides. The edge strip 12 has a web portion 31 and a thicker marginal portion 32. The edge strip 13 has a web portion 33 and a thicker marginal portion 34. The marginal portions 32 and 34 of the edge strips face the marginal portions 29 and 30 of the center strip, and the facing marginal portions are provided with releasably interlocking rib and groove elements.

The marginal portion 32 has longitudinally extending continuous rib elements 35 which project and lock into grooves in the marginal portion 29 of the center strip. Similarly, the center strip has projecting ribs 36 which interlock into grooves in the marginal portion 32. The marginal portion 34 has projecting ribs 40 which are received in grooves in the marginal portion 30, and the marginal portion 30 has ribs 39 which are received by and are interlocked in grooves in the marginal portion 34. The rib and groove structure may take other forms, but is preferably constructed in the shape illustrated with overhanging side hooklike portions and may be of the construction shown and described in the U.S. patent issued to B. Madsen 2,637,085.

The interlocking groove and rib elements of the marginal portions automatically interlock upon being pressed together, and are releasable when an adequate separating force is applied to pull the rib elements out of the groove elements, perpendicularly to the plane of the walls. This may be performed in various ways such as by sliders, but in the arrangement shown in FIGURE 2 the marginal portions 32 and 34 are provided with opening flanges 37 and 38 which may be manually grasped and drawn outwardly for separating the marginal portions. It will however be understood that the principles of the method and structure for forming two bags from a single closure strip assembly may be employed with a slider being provided for separating the marginal portions and the particular arrangement of opening flanges is shown for purposes of illustration.

The closure strip assembly is attached to the bags 18 and 19 by bonding the webs 31 and 33 of the side strips to the surfaces at the top edges 21a and 22a of the front wall of the bags. The web portion 28 is also bonded to the rear wall to form a seam at 24. Bonding may be accomplished in various ways, and if a thermoplastic material is used for the closure strip assembly and for the bags it may be accomplished by applying heat sealing or high frequency elements shown schematically at 25, 26 and 27, or the surfaces may be cemented or otherwise suitably attached. The seam 24 is sufficiently wide so that it can be severed at its midpoint and serve for the tops of the two bags 18 and 19. Severing may be accomplished by cutters 27a and 27b which are utilized when the bags are to be separated, or by use of a tear seal die.

It will be noted that in FIGURE 2 the closure strip assembly 10 is inverted from the position shown in FIGURE 1, and that the ribs of the marginal portions 29 and 30 at the sides of the center strip point in the same direction. With this construction the strips of the two finished bags 18 and 19 will open in the same direction. In other words, the side strips 12 and 13 are attached to the upper edges of the front wall of the bag so that the marginal portions face downwardly and overlie the center strip and the front wall will be drawn outwardly as the closure strip is opened for free access to the bag.

FIGURE 3 illustrates the same closure strip assembly 10 employed for providing a wide slot or opening in a wall, such as the side of a container. In this construction, the center strip 11 remains intact, and when the interlocking rib and groove elements of the marginal portions are drawn apart the entire center strip is drawn away from a slotted opening in a wall.

FIGURE 3 shows a wall with edge portions 41 and 42 separated with a slot therebetween, and the web portions 31 and 33 of the side strips secured to the edges 41 and 42 of the wall. The center strip 11 in this arrangement is shown as opened and closed by a slider assembly including a first slider 43 and a second slider 44 at each side of the center strip 11. The sliders 43 and 44 are joined by a yoke 45 in the form of a rod secured at its ends to the sliders. Wire handle 46 is attached to the rod 45. A thickened portion may also be provided at the end of the strip 11 with an opening 47 therethrough which locks over a locking button 48. The handle 46 may also snap over the button 48 to lock the sliders 43 and 44 in closed position.

The sliders move to the right, as shown in FIGURE 3, for pressing the marginal portions 29 and 32 together at one side, and the marginal portions 30 and 34 together at the other side of the center strip 11. The sliders 43 and 44 move to the left as shown in FIGURE 3, to separate the marginal portions, and for this purpose have a separator bar 43a and 44a, FIGURE 4. The bar is located at one end of the sliders only and gives the sliders the appearance of an S-shape with the slider 44 having an S-shape, as viewed in FIGURE 4, and the slider 43 having an inverted S-shape. The individual sliders are formed of a shaped, formed, pressed or cast material in FIGURES 3 and 4. In the structure of FIGURE 5 a compound slider structure is provided uniquely formed of a flat sheet material of uniform thickness. FIGURE 7a illustrates a slider assembly of either type operating with the strip 11 for opening a wide gap in the side of the container 46a and it will of course be appreciated that the closure strip can be used in various environments where a widened slot is to be opened and closed in a wall.

FIGURES 5 through 7 illustrate a stamped slider assembly 50 made of sheet material, such as metal, of uniform thickness. A fastener or closure strip assembly is shown with a center strip 51 and side strips 52 and 53. The center strip has side marginal portions 54 and 55 and the side strips have marginal portions 56 and 57, with the marginal portions of the side strips facing the marginal portions of the center strip and having interlocking rib and groove elements thereon. The marginal portions are pressed together or separated by slide units 58 and 59 which are interconnected to move together. The slide assembly 50 moves to the right in an opening direction, as shown in FIGURE 7, to separate the marginal portions, or to the left in a closing direction to join the marginal portions.

Each of the slider units 58 and 59 includes upper and lower portions, and the lower portion is formed by a plate having side upwardly facing U-shaped ends 61 and 62 and a bar 60 across the center. The bar is attached to another bar 62a for the upper portion of the sliders which have downwardly facing U-shaped sections 60a and 61a. The bar 62a extends across between the marginal portions of the strips and is of a shorter length than the slider units, as illustrated in FIGURE 7. The sliders are provided with inner surfaces tapered together toward the closing end of the slider units so as to effect a closing pressure on the marginal portions forcing the ribbed elements into the groove elements. Across the top of the slider assembly 50 is a yoke 63 secured at the ends to the slider units 58 and 59 and having a wire handle or metal tab 64 attached thereto for gripping and pulling the slider assembly. The yoke 63 is attached at its ends such as by welding to the slider unit, and the bar portions 60 and 62a are also secured to each other such as by welding to form a unit.

Thus it will be seen that the slider can be formed of inexpensive flat material cut and shaped in the manner illustrated and described.

FIGURE 8 illustrates a continuous sheet 65 of fastener or closure strips such as illustrated at 66 and 67. These strips can be manufactured by extruding at one time from dies and be attached to each other after extrusion with the interlocking hook and groove elements serving to hold the strips of the sheet together. The sheet thus provides a handy arrangement for storage of the strips in sheet form and lengths can be cut from the end of the sheet as they are needed. Also, a cut across the sheet of a desired length will provide a plurality of closure strips of a desired length.

The closure strip 66 is illustrated as having marginal portions 68 and 69 attached to a central web portion, and the closure strip 67 has marginal portions 70 and 71 at the edges of a center web portion. The marginal portions are provided with rib and groove elements, as illustrated by the rib 72 and the groove 73 of the marginal portion 68. Down the center of each of the web portions is a line of weakened resistance such as illustrated by the perforations 74 and 75. The strips can be separated or torn along these perforated lines to remove a closure strip. Strips are removed by tearing from the edge of the sheet, and tears along the lines 74 and 75 will provide a closure strip with the marginal portions 69 and 70 and the attached web portions 84 and 85. These web portions will be used for attaching to walls of a pouch or the like at the sides of an opening for providing a closure. Opening and closing means may be provided such as a slider, or the marginal portions may be otherwise manually separated and closed.

The perforated lines such as 74 and 75 can be easily made after the strips are extruded and the marginal portions joined, by passing the sheet between a plurality of perforating wheels 76 and 77 which have circumferential cutting edges that cut through the material and circumferentially spaced notches which leave the material whole between the cuts. The wheels are mounted on shafts 78 and 79 synchronized and driven through gears 80 and 81, FIGURE 10. By providing a plurality of sets of wheels such as shown by the pairs 76, 77 and 76a, 77a, the entire sheet can be passed through the wheels in a single pass. The thus formed sheet may be carried on a roll 82 as illustrated in FIGURE 11 with the sheet 83 being wound thereon and the sheet can be withdrawn as lengths are cut from the end. If desired, the sheets can also be perforated crosswise at intervals for defining the lengths of strips needed.

In the arrangement of FIGURE 8, the strips are extruded with the rib elements facing in opposite directions at the two edges. This provides a series of uniform closure strips. It will of course be recognized that if desired the strip units with the marginal portions at their edges may have ribs facing in the same direction with the strip units alternated. In other words, a plurality of center strips such as illustrated at 11 in FIGURE 1 may be used with alternate strips turned to face in opposite directions.

Thus it will be seen that we have provided an improved method and structure for fastener or closure strips of a flexible material for use in pouches, containers, bags and similar utilizations which meet the objectives and advantages above set forth. The structures shown are able to take advantage of the features of inexpensive production by extrusion of plastic materials.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. The method of making pouches with reclosable closure strips at the top comprising forming a pair of pouches with a continuous joined rear wall interconnecting the pouches and with a gap in the front wall, attaching a closure strip in said gap having a center strip and side strips with releasably interlocking rib and groove elements between each side of the center strip and side strips, said center strip having a web portion between the sides thereof, forming a seal between the rear wall of the pouches and said web portion, and severing the web portion and rear wall through said seal so that the pouches will be separated with a portion of the center strip and one of the side strips providing a reclosable closure for each pouch.

2. The method of forming plural bags with front and rear walls comprising extruding a flexible closure strip assembly having a center strip with fastener elements on each side and having edge strips with fastener elements along one side, securing the other sides of said edge strips to the top edges of the front walls of the bags, securing the center strip to the rear walls of the bags, and separating the center strip between the fastener elements so that the rear walls of the separate bags are attached to the separated sections of the center strip and each bag has a fastener element from the center strip and a fastener element from one edge strip.

3. The method of forming plural bags from a multiple bag structure having front walls and a continuous rear wall comprising, extruding a flexible closure strip assembly having a center strip with fastener elements on each side and having edge strips with fastener elements along one side, fastening the other sides of said edge strips to the top edges of the front walls of the bags, fastening the center of the center strip over a broad area to the rear wall of the bags, and separating the center strip and rear wall between the fastener elements so that separate bags are formed and the rear walls of each bag are attached to the separate sections of the center strip and each bag has a fastener element from the center strip and a fastener element from one of the edge strips.

4. A pouch construction comprising a front wall with a gap therein, a continuous rear wall joined to said front wall to form a pouch enclosure, a closure strip structure in said gap having a center strip and having edge strips, said center strip having a center web portion and marginal edge portions, and said edge strips having web portions attached to the front wall at the edge of the gap and marginal portions of the edge strips facing the marginal portions of the center strip, said marginal portions having releasable interlocking means, and a broad seam attaching said web portion of said center strip to said rear wall with one of the marginal portions of the center strip and of one of the edge strips being on each side of said seam, said seam being of sufficient breadth so that the web portion and rear wall may be severed along said seam to form separate pouches each with releasable interlocking means.

5. A fastener strip assembly for forming a dual pouch from a pouch structure having a rear wall and a front wall with a gap therein, the strip assembly comprising a planar center strip and edge strips, said planar center strip having a center web portion and having marginal portions with continuous releasable pressure interlocking elements along each side edge, said edge strips having web portions at their outer edges adapted for attachment to the front wall of a pouch structure at the edges of a gap therein, and having marginal portions at their other edge with continuous releasable pressure interlocking elements extending therealong, said interlocking elements being continuous flexible plastic rib and groove elements, the interlocking elements on the edges of said center strip both facing upwardly in the same direction laterally of the plane of the center strip and the interlocking elements on the edges of said edge strips both facing downwardly in the same direction laterally of the plane of the edge strips with the edge strips lifting upwardly to separate in an upward direction from their respective edges of the center strip so that the front wall of separate pouches made from a pouch structure to which the strip assembly is attached opens away from the rear wall for access to the interior thereof, and said center web portion of the center strip being of sufficient width so that it can be attached to the rear wall of a pouch structure by a broad seam and the seam severed along its center to form separate pouches.

References Cited by the Examiner
UNITED STATES PATENTS

| | | | |
|---|---|---|---|
| Re. 24,613 | 3/1959 | Hageltorn | 24—201.3 X |
| 681,659 | 8/1901 | Sallade | 229—69 |
| 1,553,554 | 9/1925 | Roberts | 264—248 |
| 2,099,853 | 11/1937 | Konelsky | 150—42 |
| 2,178,885 | 11/1939 | Buff et al. | 24—205 |
| 2,354,485 | 7/1944 | Slaughter. | |
| 2,452,884 | 11/1948 | Werner. | |
| 2,533,850 | 12/1950 | Syracuse | 150—42 X |
| 2,565,167 | 8/1951 | Bres | 190—41 |
| 2,613,421 | 10/1952 | Madsen. | |
| 2,736,079 | 2/1956 | Staller et al. | |
| 2,777,181 | 1/1957 | Morner. | |
| 2,780,261 | 2/1957 | Svec et al. | 150—3 |
| 2,789,609 | 4/1957 | Post | 150—3 |
| 2,791,807 | 5/1957 | Morin. | |
| 2,873,566 | 2/1959 | Sylvester et al. | |
| 3,090,075 | 5/1963 | Provenzano et al. | 18—12 |

FOREIGN PATENTS

| | | |
|---|---|---|
| 151,902 | 6/1953 | Australia. |
| 1,031,136 | 3/1953 | France. |
| 1,188,166 | 3/1959 | France. |
| 1,112,446 | 8/1961 | Germany. |
| 482,006 | 3/1938 | Great Britain. |
| 284,060 | 11/1952 | Switzerland. |

FRANKLIN T. GARRETT, *Primary Examiner.*

WALTER A. SCHEEL, *Examiner.*